Figure 1:
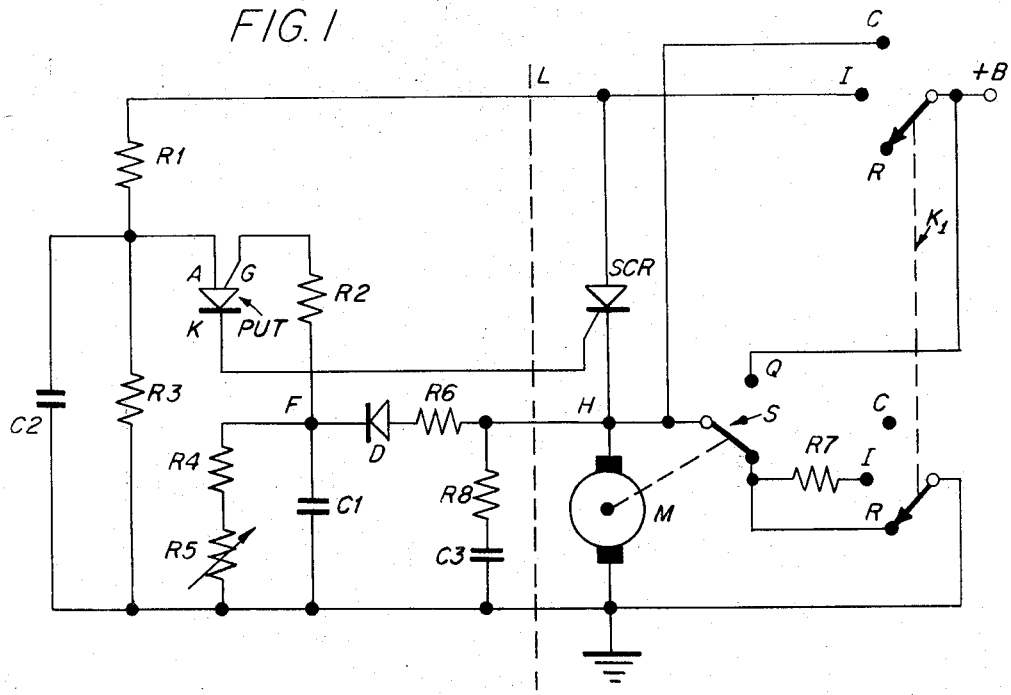

United States Patent [19]

Basso et al.

[11] 3,783,362
[45] Jan. 1, 1974

[54] ELECTRONIC CONTROL DEVICE FOR INTERMITTENT OPERATION OF A WINDSCREEN WIPER, PARTICULARLY FOR MOTOR VEHICLES

[75] Inventors: Eugenio Basso, Levico; Gaetano Viviani; Luigi Cartabia, both of Milano, all of Italy

[73] Assignee: Fabbrica Italiana Magneti Marelli S.p.A., Milan, Italy

[22] Filed: Nov. 2, 1971

[21] Appl. No.: 194,968

[30] Foreign Application Priority Data
Nov. 5, 1970  Italy ................................. 31340/70

[52] U.S. Cl. ............................ 318/443, 318/DIG. 2
[51] Int. Cl. ............................................. H02p 3/16
[58] Field of Search ....................... 318/443, DIG. 2

[56] References Cited
UNITED STATES PATENTS
3,614,573  10/1971  Rieman ............................. 318/443
3,364,410  1/1968  Foreman ........................... 318/443
3,335,352  8/1967  Neapolitakis ..................... 318/443

*Primary Examiner*—B. Dobeck
*Attorney*—Ostrolenk et al.

[57] ABSTRACT

An adjustable electronic timing device for controlling the operating speed of windscreen wipers. A switch is provided for operating the wipers in either a continuous or an intermittent fashion. During intermittent operation, a programmable unijunction transistor (PUT) is caused to conduct to trigger an SCR which is connected in circuit to the wiper motor. A capacitor is charged during each wiping cycle and discharges at the termination of each wiping cycle to prevent retriggering of the SCR until the capacitor is fully discharged. The wiper operating frequency is adjusted by adjusting the resistivity of the discharge path for the capacitor. A braking circuit is provided for dynamic braking of the wiper motor.

6 Claims, 3 Drawing Figures

PATENTED JAN 1 1974          3,783,362

ELECTRONIC CONTROL DEVICE FOR INTERMITTENT OPERATION OF A WINDSCREEN WIPER, PARTICULARLY FOR MOTOR VEHICLES

This invention relates to an electronic control device for continuously and/or intermittently operating windscreen wipers, particularly for motor-vehicles, of the design where at the beginning of each intermittent cycle the operating motor for the wiping arms is supplied through a silicon controlled rectifier and then through the limit switch, and where the beginning of each cycle is controlled by an electronic timing circuit supplying the triggering signal to the silicon controlled rectifier.

The main object of the present invention is to provide a novel device of the above character, where the timing circuit can supply the triggering signal to the silicon controlled rectifier for the beginning of a new cycle only after the completion of the preceding cycle (limit switch moving back to park or home position), so as to prevent the triggering signal frequency from exceeding the cycle frequency of the wiping arms.

Another object of the invention is to provide a timing circuit which allows for the adjustment of the cycle frequency according to requirements and in which the beginning of the first cycle occurs concurrently with the connection of the intermitting circuit.

A still further object is to provide a very simple, economical and highly reliable timing circuit.

According to the invention, the above objects are attained by a timing circuit comprising a programmable unijunction transistor which is controlled by the voltage of a capacitor charging as the motor is supplied and discharging as the motor is braked, so as to cut off said transistor at the first step and to trigger it at the second step after some interval.

According to a preferred simple embodiment, the unijunction transistor is connected by its anode to the supply battery and by its cathode to the control electrode of a silicon controlled rectifier, whereas its gate is controlled by said capacitor which is charged by the motor supply circuit through a unidirectional line and which is discharged on a circuit having a varying time constant. As the limit switch is also connected to the motor supply circuit, it is evident that only when said switch moves back to park or home position, the capacitor can discharge, reducing the gate voltage of the unijunction capacitor until it is below the anode potential, so that a triggering signal is supplied to the silicon controlled rectifier for controlling a new cycle.

Figure 2:
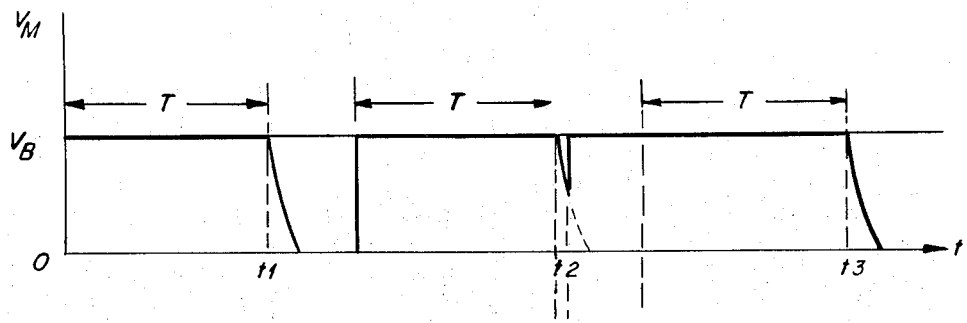
Figure 3:
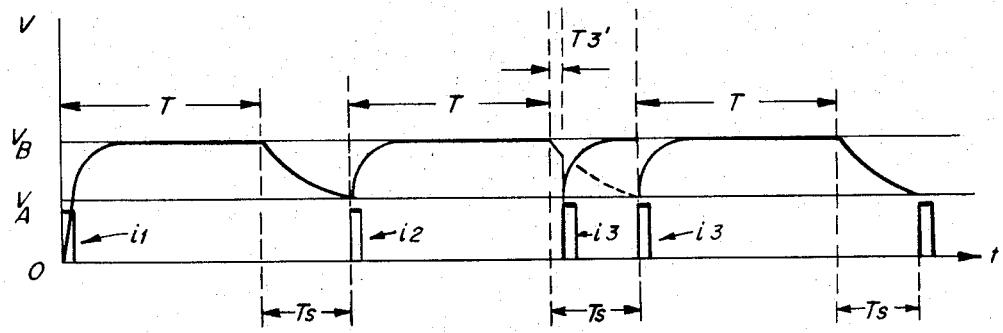

Further features and advantages of the invention will become more apparent from the description of the appended drawings, given by mere way of not limiting example, and in which:

FIG. 1 is the electric diagram of a windscreen wiper control circuit according to the invention;

FIG. 2 is a very approximate waveform diagram showing the shape of the voltage vz. time across the operating motor for the wiping arms during a few cycles of the intermittent operation; and FIG. 3 is also a very approximate waveform diagram showing the shape of the triggering voltage for the silicon controlled rectifier and the charging and discharging voltage of the capacitor during a few cycles of intermittent operation.

In the diagram of FIG. 1, by mere way of illustration, the control portion of the circuit is shown at the right of line L, while the timing circuit is shown at the left.

As well known, the control portion comprises the supply battery +B, the double-throw, three-point switch $K_1$, the c.c. motor M and associated limit switch S, and the silicon controlled rectifier SCR. One of the three points of switch $K_1$ is the rest position R shown in FIG. 1, another point is the intermittent operation position I and the third is the continuous operation position C.

The timing circuit according to the invention comprises the programmable unijunction transistor PUT having its anode A connected to battery +B through the resistor $R_1$ and the switch $K_1$ at position I, its cathode K connected to the control electrode of the silicon controlled rectifier and its gate G connected through resistor $R_2$ to capacitor $C_1$ at point F. Said anode A is also grounded through the parallel connection of capacitor $C_2$ and resistor $R_3$ the latter forming with $R_1$ a supply voltage divider for the anode.

In turn, said point F is both connected to ground through the fixed resistor $R_4$ and the varying resistor $R_5$ series connected with $R_4$, and the supply terminal H of motor M through the rectifier diode D and resistor $R_6$. The limit switch S, shown at park or home position P, is also connected with terminal H. Terminal H is also connected to ground through series connected of a capacitor $C_3$ and resistor $R_8$.

In continuous operation, battery B will directly supply in known manner the motor M through the switch $K_1$ at position C. At the end of operation and $K_1$ at position R, as soon as limit switch moves back to position P, the motor is shorted and quickly stops.

In intermittent operation, the switch $K_1$ is moved to position I, and the positive pole of battery +B is applied through resistor $R_1$ both to the anode of the silicon controlled rectifier SCR and to the anode A of the programmable unijunction transistor PUT.

Under these conditions, the silicon controlled rectifier SCR is not conductive because of not being triggered, while transistor PUT becomes conductive as the potential at its gate G is lower than that of anode A. Thus, the outlet current from cathode K provides for triggering the silicon controlled rectifier SCR with resultant supply of motor M and actuation as well of the wiping arms which will start a first cycle (forward and backward stroke).

Just after starting, the limit switch S is moved to position Q, so that the supply for the motor is maintained through this switch and the silicon controlled rectifier SCR is disconnected.

At the end of the cycle, switch $K_1$ being still at position I, switch S is moved back to position P, the supply for the motor is cut off and the electric braking for the motor is accomplished through the circuit comrpising the resistor $R_7$.

FIG. 2 shows at T the supply time for the motor and at $t_1$, $t_2$, $t_3$, etc., the instants at which braking begins. Time T depends on the vehicle windscreen glass cleaning degree and battery voltage, etc., and therefore can vary.

Moreover, during motor supply, capacitor $C_1$ is charged through resistor $R_6$ and diode D and thus threr is also an increase of potential at gate G of the programmable unijunction transistore PUT connected through resistor $R_2$ to capacitor $C_1$. The potential at gate G is immediately raised to a higher level than that at anode A, which assures that at this step no triggering signal can be supplied to the silicon controlled rectifier SCR from the cathode K, the programmable unijunction transistor PUT being cut off.

At the end of cycle (switch S at position P), the voltage across the motor will suddenly drop to zero (see descending port of curve in FIG. 2) and the capacitor $C_1$, disconnected from the terminal H due to the provision of the rectifier diode D will discharge to ground through the series resistors $R_4$ and $R_5$. Thus, the potential at the capacitor $C_1$ and gate G is reduced until the potential at gate G is lower than that at anode A, at which time the programmable unijunction transistor PUT triggers, or is conductive again, the silicon controlled rectifier SCR is triggered again and the motor is started again to control a second cycle.

FIG. 3 shows the shape of the potential at capacitor $C_1$, and hence the potential at gate G, at the charging and discharging steps of said capacitor, as well as the control pulses $i_1$, $i_2$, $i_3$ acting on the silicon controlled rectifier SCR.

T is also the charging time for the capacitor $C_1$, $T_s$ the discharging time and $V_A$ the potential at anode A of the PUT.

From the foregoing it will be apparent that a new triggering signal could not appear on the silicon controlled rectifier SCR, and motor supply and start as well, prior to total time $T + T_s$ being elapsed, that is until the end of the preceding cycle plus time $T_s$.

Since the discharge of capacitor $C_1$ occurs through a circuit comprising a variable resistor $R_5$, it is also apparent that by varying the insistance of the latter, such as by means of a knob in the reach of the vehicle driver, this time $T_s$ can be reduced or increased from a minimum corresponding to the connection of only resistor $R_4$ on the discharge circuit to a maximum corresponding to the connection of $R_4$ and $R_5$ as a whole. As a result, this would correspond to the possibility of varying the time ($T + T_s$) between the beginning of a cycle and that of another cycle, or the cycle frequency.

The advantage of this control is evident, since depending on weather conditions or vehicle glass dirt, the driver will accordingly adjust the cycle frequency. From the circuit it will also be seen that the first cycle starts concurrently with the connection of the intermittent circuit. Thus, as soon as switch $K_1$ is moved to position I, capacitor $C_1$ is in a discharged state, whereby the potential of gate G is lower than that of anode A; thus, the programmable unijunction transistor PUT is triggered, followed by the silicon controlled rectifier SCR and the first cycle of the wiping arms is initiated concurrently with the connection of the intermittent circuit.

A further feature of the circuit is that the circuit is not affected sudden variations in the battery voltage which could cause an untimely supply of triggering signals to the silicon controlled rectifier SCR. The provision of capacitor $C_2$, connecting the anode A to ground, assures a correct operation of the circuit also under the conditions above mentioned.

According to an important aspect of the invention, the series circuit RC parallel connected with motor M and comprising the resistor $R_8$ and capacitor $C_3$ is also effective as a protection against the untimely triggerings of the silicon controlled rectifier SCR. This circuit prevents the SCR from being triggered again when the electric braking for the motor in initiated in the intermittent operation. Thus, at this time the motor ceases to operate as such and acts as a generator providing a current switch (reversal) from inlet to outlet current.

The RC series circuit makes such current transients less abrupt, thus avoiding any re-triggering of the silicon controlled rectifier SCR.

Of course, the values for the resistor $R_8$ and capacitor $C_3$ are selected in connection with the inductive characteristics of the motor, as the circuit is one acting on the dispersed induction. It is obvious that such a circuit RC can be applied to any windscreen wiper device having a timing circuit other than that shown.

A particular embodiment of the timing circuit has been described, but it is evident that the diagram shown can undergo changes, additions and the like according to practical requirements without departing for this from the spirit of the invention. Thus, through slight variations, the capacitor $C_1$ could act on the anode rather than on the gate of the programmable unijunction transistor PUT. In any case, the capacitor acts to to provide for triggering the programmable unijunction transistor PUT, or to cut off the same.

It is also apparent that the timing circuit can be applied to any other c.c. motor having a braking circuit. Where the motor is of the permanent magnet excitation type, resistor $R_7$ is the braking resistance. On the contrary, where the motor is a winding excitation motor, resistor $R_7$ would correspond to the braking winding.

Finally, the braking circuit for the motor may be an electronic circuit, provided with or without a mechanical limit switch.

What is claimed is:

1. An electronic control device for a windscreen wiper motor having a pair of input terminals comprising:
   a supply source;
   a wiper selector switch connected to said source;
   a silicon controlled rectifier (SCR) for connecting said switch to a first input terminal of said motor;
   said selector switch being operable between an open and a closed position;
   timing circuit means comprising a programmable unijunction transistor (PUT) having anode and cathode electrodes coupled between said selector switch and the trigger electrode of the SCR and having a gate electrode;
   a timing capacitor coupled between the remaining input terminal of the motor and said gate electrode;
   charging means coupled between said timing capacitor and said SCR for abruptly charging said capacitor when said SCR conducts;
   said PUT being rendered conductive only when the voltage level at its gate electrode is below the voltage at its anode to immediately trigger the SCR into conduction upon closure of said selector switch;
   said timing capacitor being adapted to charge to a voltage level higher than the voltage level at its anode to prevent said motor from operating for a predetermined time interval after completion of one wiping cycle;
   said motor means including switch means operated by said motor for directly coupling the first input terminal of said motor to said source as soon as the motor is energized to begin an operating cycle causing said SCR to be turned off and for disconnecting said motor from said source at the end of each wiping cycle;

discharge means coupled across said capacitor for controlling the discharge rate of the timing capacitor and thereby controlling the time interval between the end of a wiping cycle and the beginning of the next wiping cycle by controlling the time interval required for the voltage level applied by the timing capacitor to the PUT gate electrode to fall below the voltage level at said PUT anode.

2. The device of claim 1 further comprising a voltage divider coupled between said source and said PUT anode for controlling the voltage level applied to the PUT anode.

3. The device of claim 1 further comprising a smoothing capacitor coupled between the PUT anode and reference potential for smoothing the input to the PUT anode.

4. The device of claim 1 wherein said discharge means further comprises an adjustable resistance element for altering the discharge rate of the timing capacitor, said discharge circuit ($R_4$, $R_5$) of said control capacitor ($C_1$) is of a variable time constant.

5. The device of claims 1 wherein said charging means comprises a diode.

6. The device of claim 1 further comprising series connected resistor element and capacitor element coupled across the input terminals of the motor for preventing undesirable discharge of said timing capacitor and hence preventing spurious triggering of the SCR by the PUT.

* * * * *